US008429386B2

(12) United States Patent
Jordan et al.

(10) Patent No.: US 8,429,386 B2
(45) Date of Patent: Apr. 23, 2013

(54) DYNAMIC TAG ALLOCATION IN A MULTITHREADED OUT-OF-ORDER PROCESSOR

(75) Inventors: Paul J. Jordan, Austin, TX (US);
Robert T. Golla, Round Rock, TX (US);
Jama I. Barreh, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 967 days.

(21) Appl. No.: 12/494,532

(22) Filed: Jun. 30, 2009

(65) Prior Publication Data

US 2010/0333098 A1    Dec. 30, 2010

(51) Int. Cl.
G06F 15/00    (2006.01)
G06F 9/30    (2006.01)
G06F 9/40    (2006.01)

(52) U.S. Cl.
USPC .......................... 712/218; 712/220; 712/216

(58) Field of Classification Search .................. None
See application file for complete search history.

(56) References Cited

U.S. PATENT DOCUMENTS

| 5,805,849 | A | | 9/1998 | Jordan et al. |
| 5,896,542 | A | * | 4/1999 | Iadonato et al. ............... 712/23 |
| 6,212,621 | B1 | * | 4/2001 | Mahalingaiah .............. 712/212 |
| 6,721,874 | B1 | * | 4/2004 | Le et al. ........................ 712/218 |
| 7,401,206 | B2 | | 7/2008 | Hetherington et al. |
| 2009/0217020 | A1 | * | 8/2009 | Yourst ........................... 712/245 |
| 2009/0259827 | A1 | | 10/2009 | Ramirez et al. |

OTHER PUBLICATIONS

"Reorder Buffer", ECEN 6253 Advanced Digital Computer Design, Mar. 9, 2005, 2 pages.

* cited by examiner

Primary Examiner — Eddie P Chan
Assistant Examiner — George Giroux
(74) Attorney, Agent, or Firm — Meyertons, Hood, Kivlin, Kowert & Goetzel, P.C.

(57) ABSTRACT

Various techniques for dynamically allocating instruction tags and using those tags are disclosed. These techniques may apply to processors supporting out-of-order execution and to architectures that supports multiple threads. A group of instructions may be assigned a tag value from a pool of available tag values. A tag value may be usable to determine the program order of a group of instructions relative to other instructions in a thread. After the group of instructions has been (or is about to be) committed, the tag value may be freed so that it can be re-used on a second group of instructions. Tag values are dynamically allocated between threads; accordingly, a particular tag value or range of tag values is not dedicated to a particular thread.

15 Claims, 10 Drawing Sheets

DYNAMIC TAG ALLOCATION IN A MULTITHREADED OUT-OF-ORDER PROCESSOR

BACKGROUND OF THE INVENTION

1. Field of the Invention

This disclosure relates generally to computer processors, and more particularly to dynamically allocating tag values between instructions in different threads of a computer processor.

2. Description of the Related Art

Some computer processors support out-of-order execution, meaning that execution results for instructions in a computer program are not necessarily computed in the order in which the instructions appear in the program (which is referred to as "program order.") Out-of-order processors typically commit (retire) instructions in program order, regardless of the order in which these instructions are actually executed. Otherwise, an incorrect processor state may result.

To maintain program order, instructions can be assigned sequence numbers. A first instruction may receive a first sequence number, and a second, subsequent instruction may receive a second sequence number indicating that the second instruction is subsequent to the first instruction in program order. The sequence numbers ensure that the second instruction, which may overtake the first instruction during an out-of-order execution of the two instructions, is not committed before the first instruction. If execution results are determined for the second instruction before determining execution results for the first instruction, a processor may delay committing the second instruction until determining that all other instructions that have a sequence number "earlier" than the second instruction's sequence number have been committed.

SUMMARY

Various techniques for dynamically allocating tags between computer instructions in a multithreaded computer processor, as well as techniques for committing instructions with allocated tags, are disclosed.

In one embodiment, an apparatus is disclosed that includes a computer processor configured to execute instructions for a plurality of threads. The processor may be configured to execute instructions out-of-order but commit the instructions in the program order in which they appear. The computer processor is further configured to assign tag values from a predetermined (or fixed) set of tag values. The tag values are usable to determine the program order for the various groups of instructions to which the tag values are assigned. The computer processor is yet further configured to dynamically allocate tag values between the plurality of threads. Thus a particular tag value in the set of tag values may be assigned to any given thread.

In another embodiment, an apparatus is disclosed that includes a computer processor configured to execute instructions for a plurality of threads; the apparatus also includes a reorder buffer. The reorder buffer may store execution information for instructions to be committed by the processor. For example, the reorder buffer may store an indication of whether an instruction has completed execution. The reorder buffer may further include a memory which may be configured to receive a value indicating a tag value assigned to a first plurality of instructions. After receiving this value, the memory of the reorder buffer may be configured to return a tag value indicating a tag value of a second plurality of instructions, where the second plurality of instructions are to be committed by the reorder buffer immediately after the first plurality of instructions. In some embodiments, the memory may be implemented as a linked list of a fixed size within an array. The memory may thus be configured to return information indicating what group of instructions is "next" in program order after a current group of instructions.

In yet another embodiment, a method is disclosed in which a reorder buffer in a multithreaded computer processor receives a first indication that a first tag value has been assigned to a first plurality of instructions being executed. The instructions may be executed within a first thread of the processor. The reorder buffer receives a second indication that a second tag value has been assigned to a second plurality of instructions within the first thread, where the second plurality of instructions is immediately subsequent to the first plurality of instructions according to a program order for the first thread. The reorder buffer also stores first and second entries in a memory, respectively corresponding to the first and second pluralities of instructions. Information is stored in the first entry indicating that the second plurality of instructions is immediately subsequent to the first plurality of instructions in program order. The reorder buffer receives information indicating the first plurality of instructions are ready to commit. (This may occur, for example, when the reorder buffer receives an indication that one or more instructions have completed execution.) The reorder buffer accesses the first entry in the memory to retrieve the indication of the second entry of the memory. Information indicating the second plurality of instructions are ready to be committed is received at the reorder buffer. The reorder buffer causes the first plurality of instructions to be committed (this may occur, for example, by sending information to a commit pipeline or commit unit). Subsequently, the reorder buffer causes the second plurality of instructions to be committed.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Overview

Figure 1:
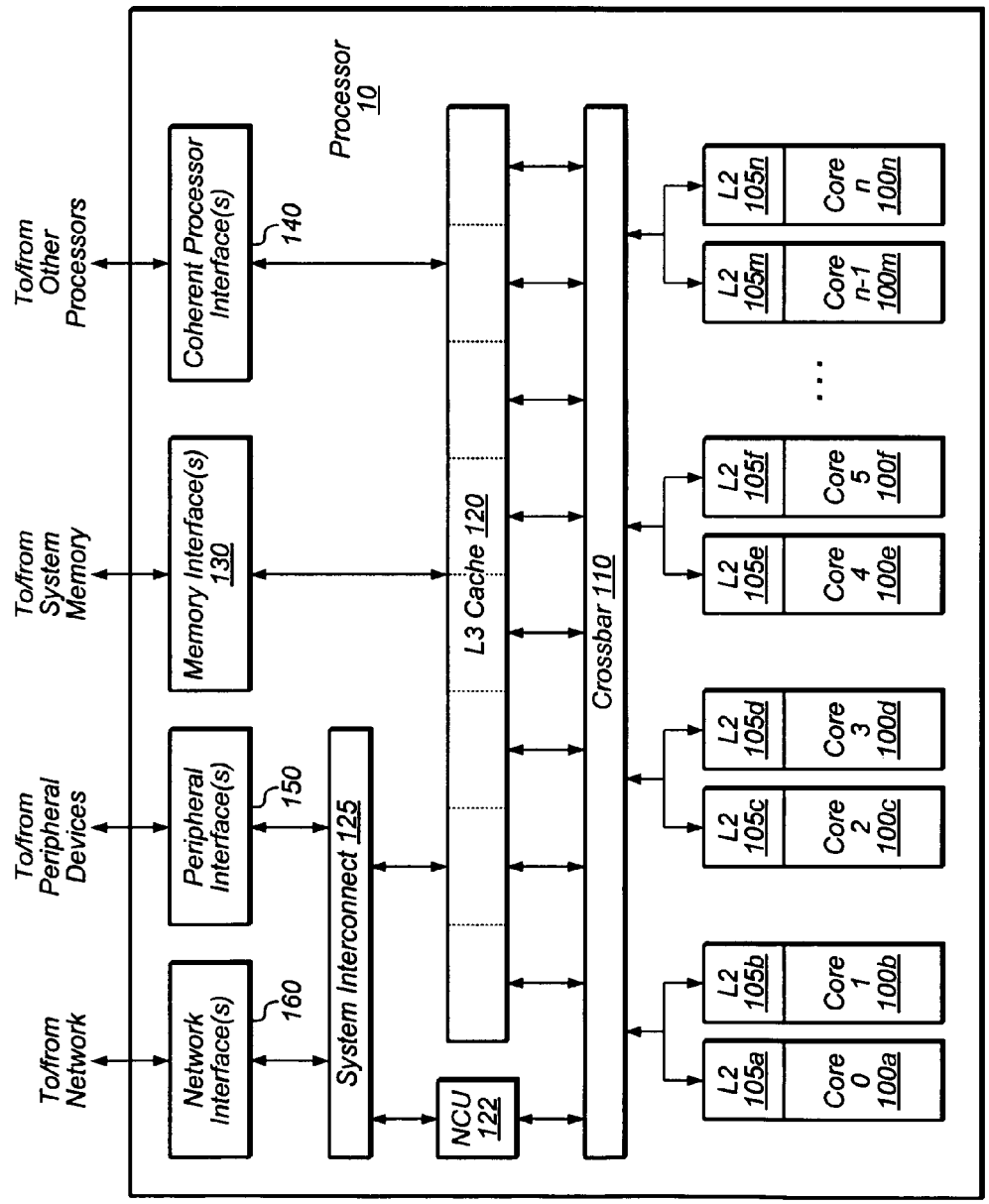
FIG. 1 is a block diagram illustrating one embodiment of a multithreaded processor 10.
Figure 2:
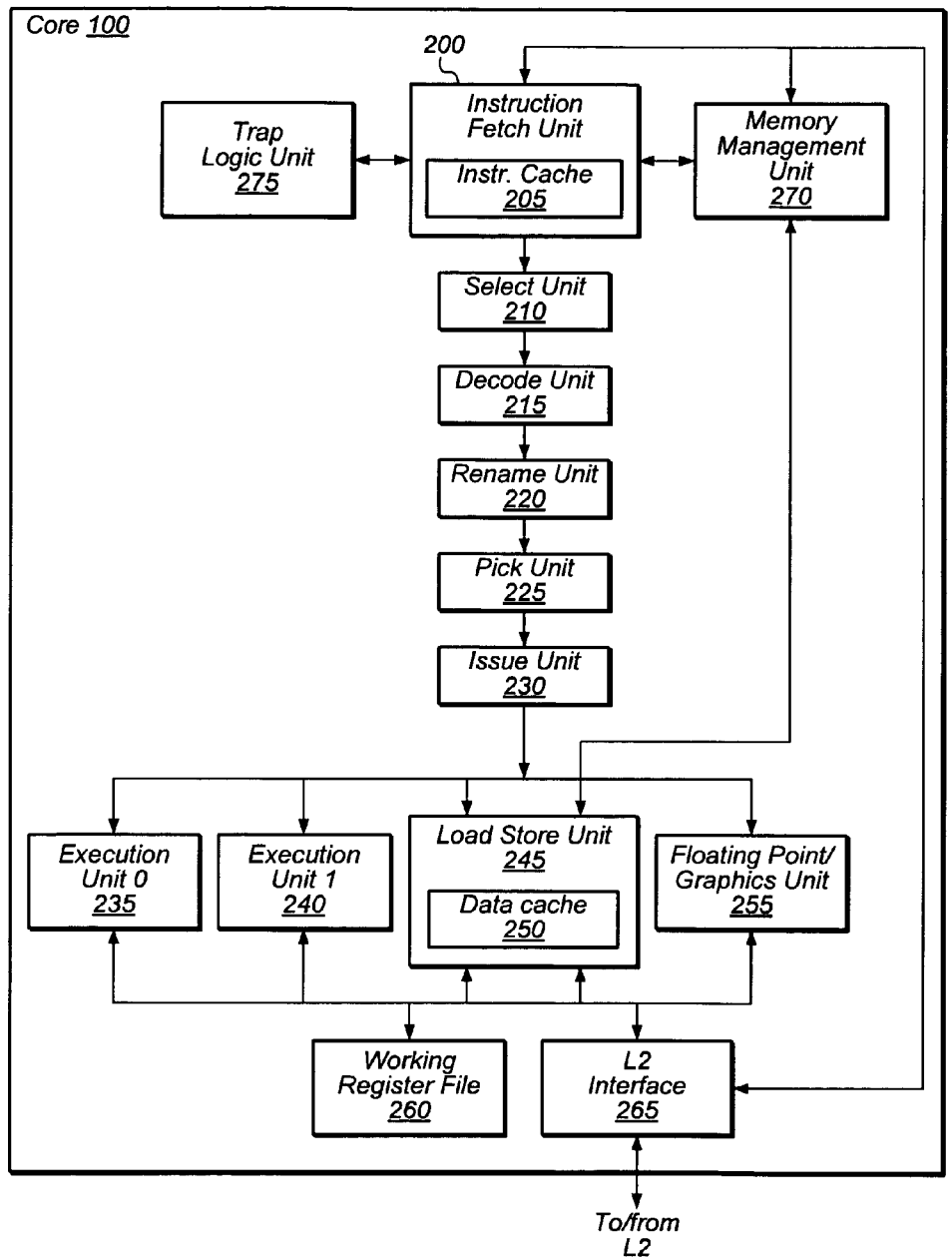
FIG. 2 is a block diagram illustrating one embodiment of a processor core 100.

FIGS. 1-2 present a general overview of an exemplary processor. FIGS. 3-8 discuss the dynamic allocation of tags and the processor's use of instructions having dynamically allocated tags. Lastly, FIG. 9 illustrates an exemplary system in which a processor employing the disclosed techniques may be utilized.

DEFINITIONS

As used herein, the following terms shall be given the following meanings:

"Program order." This term has its ordinary and customary meaning in the art, which includes the sequence in which instructions appear in a computer program. A first instruction in a thread may be said to appear "earlier" or "before" or "ahead of" a second instruction in program order of a thread (or program) when a programmer or compiler desires that the first instruction be completed before the second instruction. The described second instruction may also be said to appear "after" or "subsequent to" the first instruction in program order. If a second instruction or group of instructions is "immediately subsequent" to a first instruction or group of instructions, this means there are no intervening instructions or groups of instructions between the first and second instruction(s) in the program order.

"Computer processor." This term has its ordinary and customary meaning in the art, and includes a device with one or more cores that may be housed on one die and/or multiple dies.

"Thread." This term has its ordinary and customary meaning in the art, and includes a group of instructions executed by a computer processor. In certain embodiments, instructions in multiple threads can execute concurrently to perform different or related tasks.

"Parallel." First and second actions or operations that are performed by any portion(s) of a processor may be said to be performed in parallel (or partly in parallel) when the operations are commenced at roughly the same time, or when the two operations overlap temporally such that at some given point in time, both the first and second operations have begun, but have not yet completed.

"Commit after." A second instruction or group of instructions in a given thread (or program) may be said to commit "immediately after" first instruction(s) in the given thread when there are no intervening instructions in the given thread that are committed between the first and second instructions. The term "immediately after" in regard to commitment refers to program order and not necessarily temporal order. Thus with regard to a first thread, a second instruction may be said to commit "immediately after" a first instruction when the first instruction commits; then any number of other instructions in other threads are committed (which may take an arbitrary amount of time), and then the second instruction in the first thread commits (with no instruction in the first thread committing between the first and second instructions). Instructions that are said to "commit after" other instructions may (or may not) commit "immediately after" the other instructions.

Overview of Multithreaded Processor Architecture

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound-completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating-point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Dynamic Allocation of Tags

Figure 3:
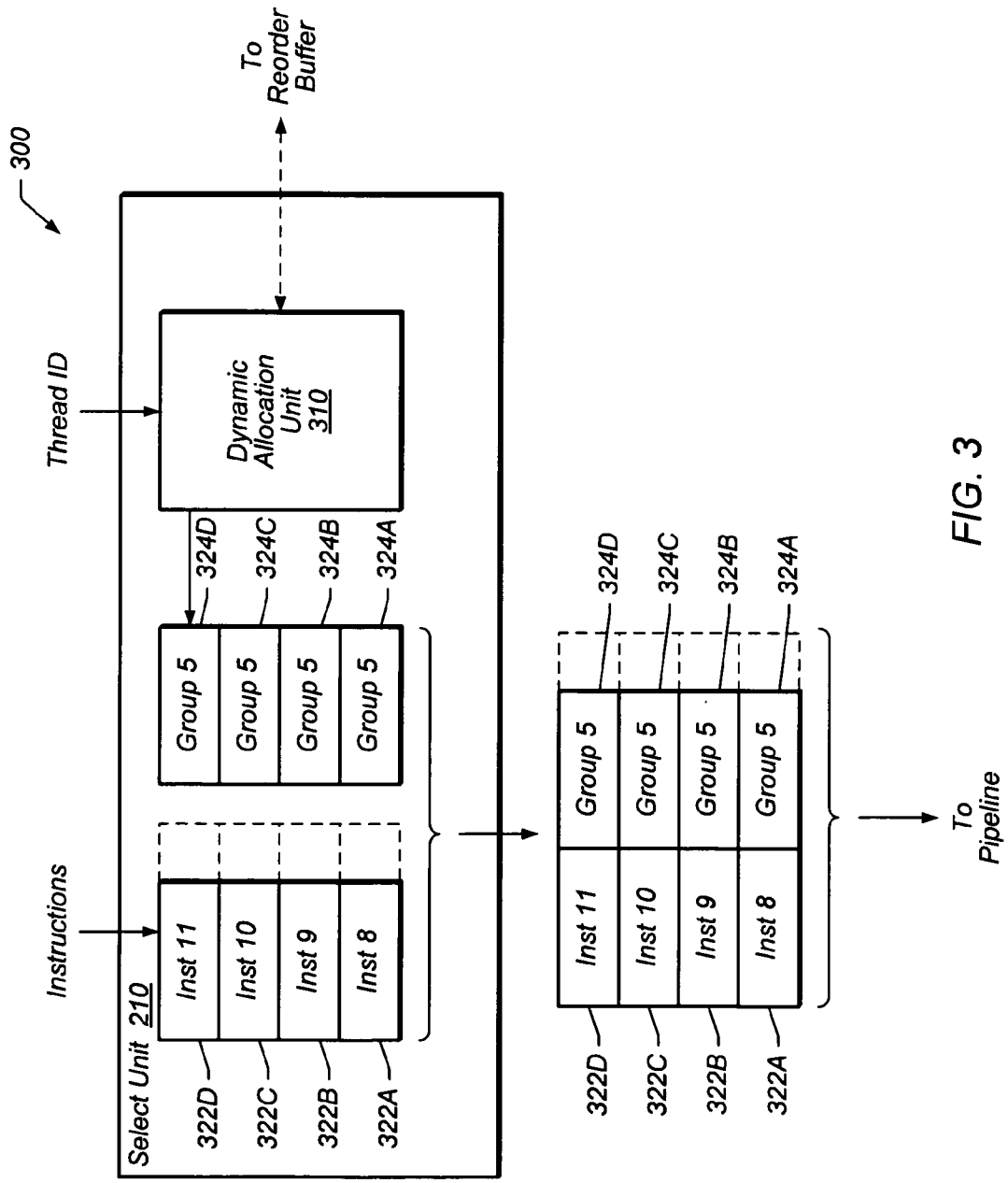
FIG. 3 is a block diagram illustrating one embodiment in which a select unit of processor core 100 is configured to dynamically allocate tags for instructions between threads.

Turning now to FIG. 3, a block diagram 300 is shown illustrating one embodiment in which select unit 210 of processor core 100 is configured to dynamically allocate tags for instructions.

Select unit 210 is configured to select instructions 322 from any particular thread. As described above, select unit 210 may acquire instructions 322 from instruction cache 205 within instruction fetch unit 200. Dynamic allocation unit 310 within select unit 210 is configured to allocate tags from a fixed set of tags (e.g., a pool of 128 possible tags) for groups of instructions within different threads. Unit 310 is depicted within select unit 210, but may be present anywhere in the circuitry of the processor in various embodiments. As described below, dynamic allocation unit 310 is configured to dynamically allocate tags between different threads supported by core 100.

Dynamic allocation of tags between threads stands in contrast to a static allocation scheme, in which various groups of the fixed sets of tags are predetermined to be allocated to particular threads. For example, in an embodiment in which there are 32 possible tags for a processor that supports up to 8 threads, tags 0-3 might correspond to thread 0, tags 4-7 to thread 1, tags 8-11 to thread 2, and tags 12-15 to thread 3, etc.

In certain situations, static allocation of tags might produce unnecessary throttling of instructions. Thread 0 in the example above might be using all of its available tags 0-3 for sixteen pending and not yet committed instructions (for illustrative purposes, a tag group in this example has four instructions). Such a scenario could occur, for example, if the first instruction was a load from memory with a comparatively long execution time. Until one of instruction groups 0-3 retires (commits), there would be no free tags thread 0 could use to indicate a program order for the additional instructions, and thus thread 0 would be unable to select any additional instructions for execution. The thread would be stalled. At the same time thread 0 was stalled, thread 1 might not be utilizing all the tags in its range (4-7). In a static scheme, thread 0 would be forced to wait despite the fact that not all tags in the set of tags were in use.

In a dynamic scheme, however, thread 0 might achieve higher performance if one or more of unused tags 4-7 were assigned to it. (For example, if thread 1 was inactive (a.k.a. "parked" or "sleeping"), it might not need to have any tags allocated to it.) Accordingly, dynamic allocation of tags between threads means that a given one of the fixed set of tags may be assigned to any given thread at a given point in time. It therefore follows that the number of tags allocated to a particular thread may change from a first point in time to a second, subsequent point in time as the number of tags for a given thread is not static or predetermined. Still further, at a first point in time, a first number of tags may be allocated to a first thread, while at a second point in time, a change in circumstances might dictate that a second (different) number of tags be allocated to the first thread. Even further, a particular tag value may be assigned to the first thread at a first point in time, while, at a later point in time, the particular tag value may be assigned to a second thread (after the first thread has used the tag and it has been freed, for example).

In the embodiment depicted, instructions 322A-322D are shown as being received by select unit 210 as one group of four instructions, but instructions can be received in groups of lesser size (a group may be as few as one instruction) or in groups of sizes greater than four. In one embodiment, instructions 322A and 322B are received by select unit 210 in a first clock cycle, and instructions 322C and 322D are received in the following clock cycle. In the embodiment shown, instructions are received by select unit 210 in program order.

In one embodiment, tag values 324A-324D are commonly assigned by allocation unit 310 to each of the corresponding group of instructions 322A-322D. That is, in this embodiment, while each instruction in group 322 is assigned its own tag value, the tag value is the same for each instruction in the group. In the example shown, tag value "5" has been assigned to instruction group 322. Tag values may be assigned to a group of instructions over one or more clock cycles. As described below, tag values may "travel" with instructions over at least a portion of the pipeline of core 100. Internal identifiers, described below, may also "travel" in a similar fashion.

In addition to being assigned a tag value, a group of instructions may also be assigned an internal identifier. This internal identifier may further be used by the processor to ensure that instructions are committed in program order. Consider an instruction appearing first in a group of four instructions and an instruction appearing fourth in that same group. These instructions may both receive the same (group) tag value, but be assigned different internal identifiers. The instruction appearing first might receive, for example, an internal identifier of "00" (binary zero) and the instruction appearing fourth might receiving an internal identifier of "11" (binary three). By assigning different internal identifiers to instructions, it may thus be possible to distinguish a program order for instructions within the same instruction group. Internal identifiers may be assigned sequentially to each instruction in the order of its appearance within a group.

The assignment of an internal identifier may occur in select unit 210 by dynamic allocation unit 310, but in some embodiments, other structures within select unit 210 or processor 100 may assign internal identifiers. In other embodiments, other information associated with instructions may effectively function as the internal identifiers described above. In yet further embodiments, internal identifiers for instructions within a group of instructions are not assigned at all, and other structure(s) or circuitry may ensure that instructions within a single group (having a commonly assigned tag value) are committed in program order (e.g., an instruction appearing later in a group is not committed before an instruction appearing earlier in the group).

As mentioned above, in one embodiment, dynamic allocation unit 310 is configured to assign tag values to instructions from a fixed set (or pool) of tag values. (In other embodiments, the pool of possible tag values may be changed dynamically—e.g., from 64 to 128 values depending on the current needs of core 100.) Because tag values are assigned dynamically, any particular tag value may be assigned to any particular group of instructions in any thread, but once a tag value is assigned, it is not reused until the tag value is freed. A tag value may be freed in some embodiments, for example, upon the commitment (retirement) of all the one or more instructions having been assigned that tag value. Tag values may also be freed upon a pipeline flush and/or under other circumstances in certain embodiments. In one embodiment, the dynamic allocation unit maintains a finite state machine that keeps track of which tags have been dynamically allocated for instruction groups of various threads. When a tag is deallocated, the finite state machine is updated. Information may be exchanged between the reorder buffer 420 and/or other areas of core 100 to keep the finite state machine up to date.

After tag values have been assigned to instructions 322, instructions 322 and their assigned tag values 324 are sent along the execution pipeline. In one embodiment, instructions 322 and tag values 324 may be passed from select unit 210 to decode unit 215 as shown in FIG. 2. Other information associated with instructions 322 may also be sent with instructions 322 as well. Although instructions are received in program order at select unit 210, as described below, instructions 322 may be executed out-of-order as they advance along the execution pipeline depicted in FIG. 2. In some embodiments, an indication of the program order (as denoted by the tag values assigned to groups of instructions) must be recorded in a reorder buffer or similar structure before (or substantially simultaneously to) those instructions entering a section of the pipeline in which the instructions may become out-of-order.

Figure 4:
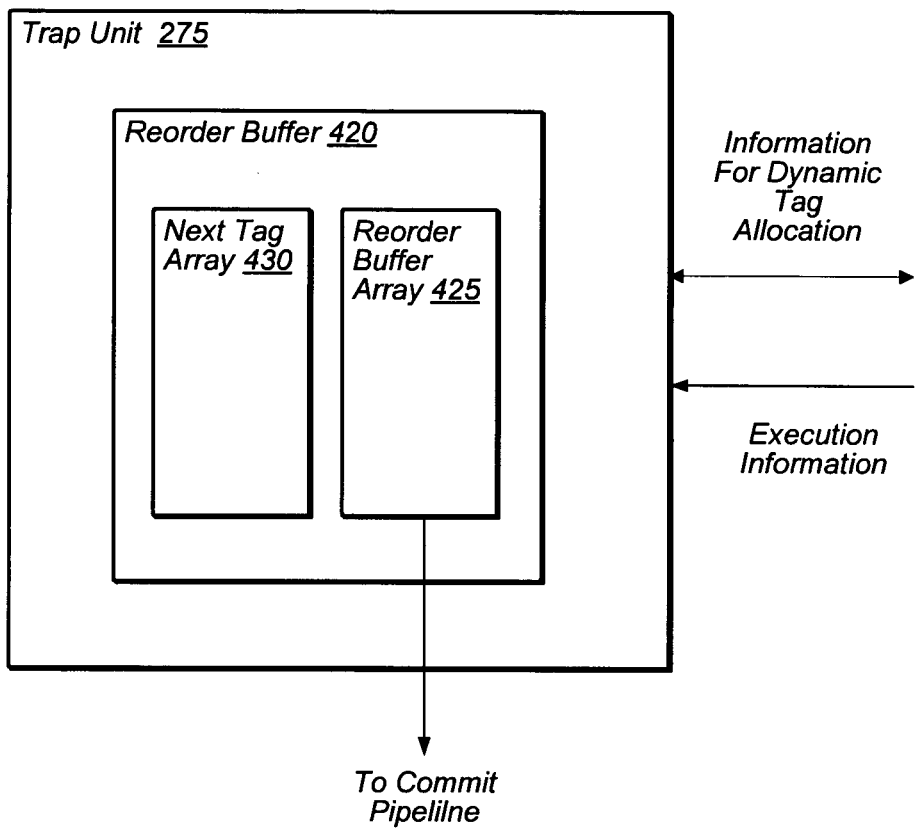
FIG. 4 is a block diagram illustrating one embodiment of a reorder buffer 420, reorder buffer array 425, and a next tag array 430 within a trap logic unit 275.

Turning now to FIG. 4, a block diagram of one embodiment of trap logic unit (TLU) 275 is shown. Reorder buffer 420 is contained within trap logic unit 275, and reorder buffer array 425 and next tag array 430 are located within the reorder buffer. However, 420, 425, and 430 may be arranged differently in other embodiments and need not be contained within the trap logic unit as depicted.

Reorder buffer 420 may be used to temporarily store execution information for instructions prior to those instructions being committed to an architectural state of the processor. This execution information may include the instruction's program counter, condition codes, various tags, speculative values, decode information, architected registers for the instruction, micro-op codes, internal identifiers, and/or other information (including execution results in some embodiments). Reorder buffer 420 is configured to ensure that, when a second instruction is subsequent in program order to a first instruction, the results of the first instruction are committed before the results of the second instruction are committed. Reorder buffer array 425 may be a particular data structure that holds execution information prior to commitment. As will be described below in greater detail, next tag array 430 is configured to indicate the order in which in which instructions are to be committed by reorder buffer 420.

TLU 275 is configured to send and/or receive information in association with the dynamic allocation of tags and the use of dynamically allocated tags. TLU 275 may receive information from the select unit 210 (or another structure that dynamically allocates tags) that indicates a particular tag in a pool of tags has been dynamically allocated. In response to receiving this information (or at a later time, such as instruction rename), the reorder buffer may reserve entries in reorder buffer array 425 corresponding to a location for the particular tag (and thus, the reserved entries also correspond to the instructions associated with the allocated tag). This process is described in more detail in regard to FIG. 5.

As instructions are executed by one or more execution units of core 100, TLU 275 may receive execution-related information for one or more of the instructions and store the information in reorder buffer array 425. In one embodiment, when information is received at the TLU indicating that all instructions in a group have completed executing, the instructions are able to be committed. In one embodiment, a group of instructions may be committed only after instructions prior to the group of instructions in program order have already been committed (or are in the process of being committed). As will be described below, next tag array 430 is used in this process. After a group of instructions has been committed (or is being committed), the tag value corresponding to that instruction group is freed and placed back in the available pool of tag values. Information indicating that the tag has been freed may be transmitted to the select unit 210 (or whatever comparable structure is configured to assign tag values). Upon receiving such information, select unit 210 may then re-use that tag value for a new group of instructions. The new group may or may not belong to a different thread than the thread of the old group of instructions. In some embodiments, two or more groups of instructions may commit at least partially in parallel while still preserving program order; these two or more groups may or may not belong to different threads.

Figure 5A:
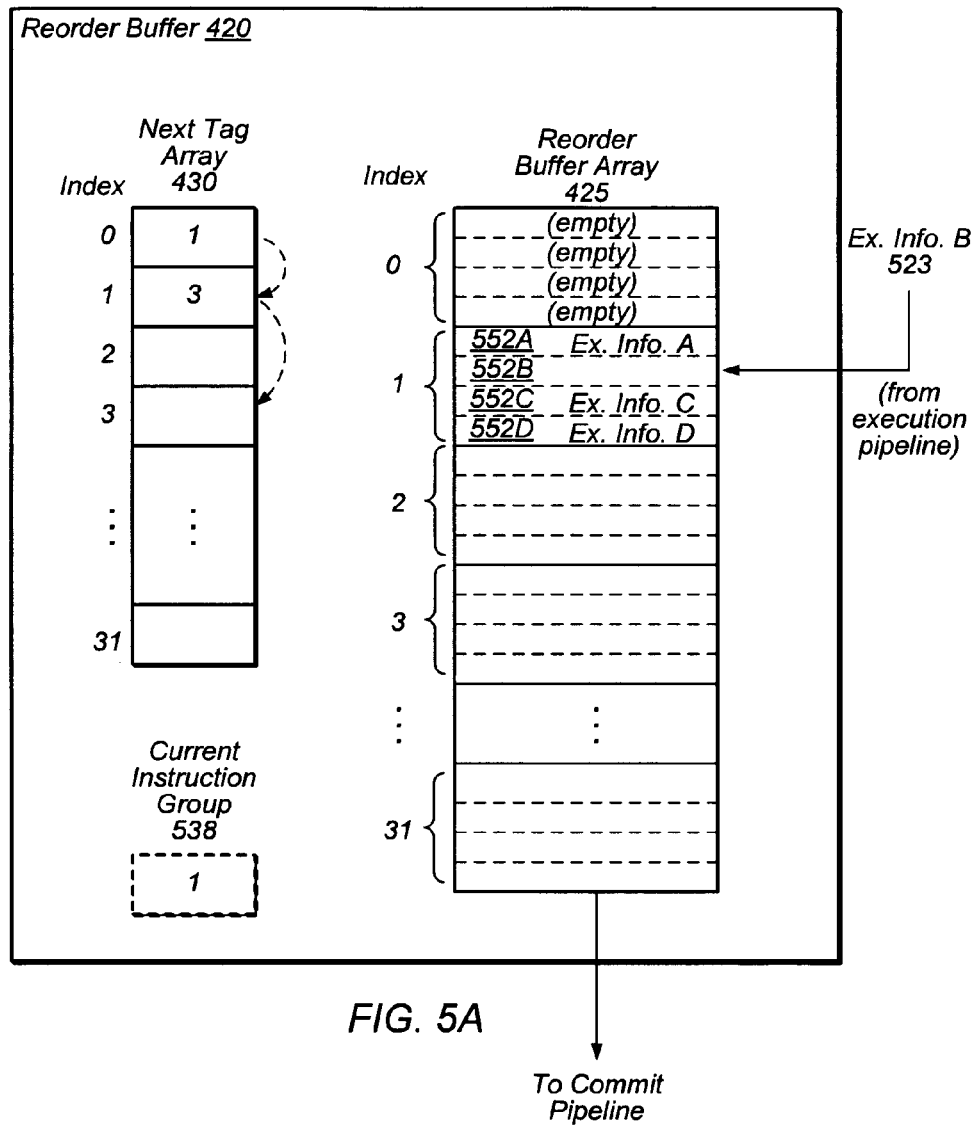
FIG. 5A is a block diagram illustrating an embodiment of reorder buffer 420.

Turning now to FIG. 5A, a depiction of reorder buffer 420 is shown. In this embodiment, next tag array 430 can be considered to represent a data structure that indicates, for each of the currently assigned tag values, the tag value of the next group of instructions to be committed. I.e., the next tag array indicates the next group in program order for a thread. Thus, if a first group of instructions (not shown) has been assigned a tag value "5" and second group of instructions (not shown) immediately subsequent to the first group has been assigned a tag value "15," next tag array 430, in one embodiment, includes an entry (corresponding to tag value 5) that includes an indication (e.g., a pointer) that the second group of instructions corresponding to tag value 15 is the next group of instructions to be committed by reorder buffer 420. In one embodiment, there are 32 available tag values, and next tag array has 32 entries, each of which includes a field 5 bits in length (which is able to indicate a "next" one of the 32 possible tag values). Next tag array 430 may thus be considered a linked list of a fixed size (i.e., the linked list may have a constant amount of storage space associated with it). By using group sizes greater than one, the storage space needed by next tag array 430 may be reduced (e.g., for a reorder buffer supporting 128 instructions, a group size of 2 would dictate 64 entries in next tag array 430, a group size of 8 would dictate 16 entries in tag array 430, etc., all of which are smaller than 128 entry array that would be needed for a group size of one instruction). Furthermore, because tags are allocated dynamically, it is possible to support a processor having different numbers of threads using a next tag array of a particular size.

In one possible embodiment, the current group (e.g., corresponding to tag value 1) of instructions being committed by the reorder buffer may be indicated in a storage location (e.g., current instruction group register/circuitry 538). Circuitry 538 may be configured to store a value representing a currently executing instruction group for each thread in the processor, and may implemented wholly or partially within the reorder buffer (or elsewhere within processor 100.) Note that at any one time, more than one group of instructions for a given thread may have been selected by 210 for execution, but not yet committed to an architectural state. Thus the "current group" may mean "first current group," and does not imply that no other group of instructions might be executing. (Note that any suitable structure, of course, may be used to track the currently executing instruction group for each of the one or more supported threads.) Reorder buffer array 425 may be implemented as a single array as shown, but other embodiments are contemplated. In one embodiment, reorder buffer 425 is implemented as a double array, each half of which is configured to store execution information for half of the instructions in an instruction group.

In FIG. 5A, the instructions corresponding to group 0 have already been committed, and thus, the "current group" status is 1. (Note that index 1 of the next tag array is pointed to by index 0.) As depicted, reorder buffer array 425 is waiting to receive execution information corresponding to group 1. In some embodiments, the execution information that is awaited includes an indication that execution has been completed. In one embodiment, the awaited execution information includes actual results from the execution of instructions, though in the embodiments pictured in FIG. 2 and FIG. 5, actual results of execution are stored in the working register file 260 and not reorder buffer 420. The execution information for three of the four instructions in group 1 have been received, as denoted by entries 552A-552D (e.g., indications of completion of execution have been received for three instructions). When the remaining execution information 523 for instruction group 1 is received from the execution pipeline (or an indication to commit is otherwise received), the reorder buffer 420 is ready to send that group of instructions to be committed. In some embodiments, instructions may be committed by entering a commit pipeline (not pictured) which performs various operations such as copying the execution results of the instructions in an instruction to a set of architectural registers.

Figure 5B:
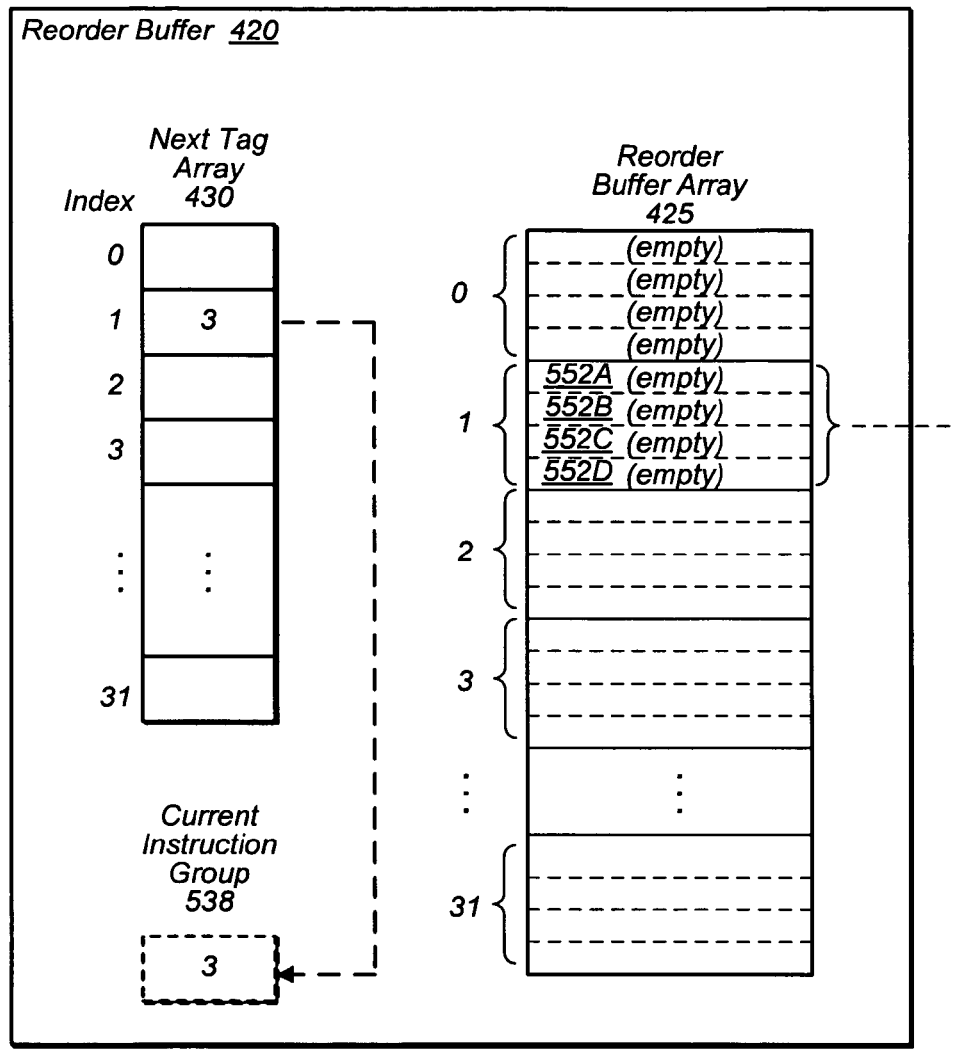
FIG. 5B is a block diagram further illustrating the embodiment of FIG. 5A.

In FIG. 5B, reorder buffer 420 has just sent the four instructions in group 1 to be committed. The entries 552A-552D that previously stored execution information for group 1 instructions have been freed, and tag value 1 goes back into the pool of available tag values so that it may be dynamically allocated to a future instruction group (either in the current thread or a different one). The reorder buffer has used the next tag array to determine that group 3 follows group 1 (e.g., the next instructions in program order after group 1 are the instructions in group 3.) The current instruction group register 538 has thus been updated to 3. The reorder buffer array is configured to await an indication that group 3's instructions have completed execution, and once that indication is received, instruction group 3 will be eligible to be committed. (In some embodiments, first instructions within a group that are earlier in program order than second instructions within the same group may be committed before all instructions in the group are ready. In certain embodiments, the allocated tag is not freed, however, until all instructions in the group are committed.) Note that in FIG. 5B, the "next group" following group 3 has not yet been determined. When that determination is made (which may occur at any time in various embodiments), the entry at index 3 in next tag array 430 will be updated.

Dynamic allocation unit 310 of core 100 may be configured to dynamically allocate a certain number of tags in a given number of clock cycles, and next tag array 430 may be configured to release that same number of allocated tags in the same given number of clock cycles. The maximum number of tags allocated in a given number of clock cycles may directly correspond to the maximum number of instructions capable of being issued by core 100 in the given number of clock cycles; the number of tags released by next tag array 430 in the given number of clock cycles may directly correspond to the number of instructions sent to commit in the given number of clock cycles. In one embodiment, processor 100 is capable of issuing two instructions per clock cycle, and reorder buffer 420 is configured to commit two instructions per clock cycle. In such an embodiment, a tag for an instruction group of size four could be dynamically allocated every two clock cycles; likewise, a tag could be freed every two clock instructions (corresponding to all four instructions of a group being committed over two clock cycles.) Also note that next tag array 430 may be configured to determine the tag value for the next instruction group within the given number of clock cycles needed for sending the current group of instructions to commit and freeing the corresponding tag. In this manner, reorder buffer 420 does not stall during the commit process. Other combinations and permutations of the above may exist depending on a chip's particular architecture. In some embodiments, the number of tags capable of being dynamically allocated in a given number of clock cycles may exceed the number of tags capable of being freed in the given number of clock cycles, and vice versa. The processor may be configured to issue N instructions in a given cycle and reading from next tag array 430 may take M cycles, where N and M are integers greater than zero. In such a scenario, the size of an instruction group for purposes of allocating tags might be M*N instructions.

Figure 6:
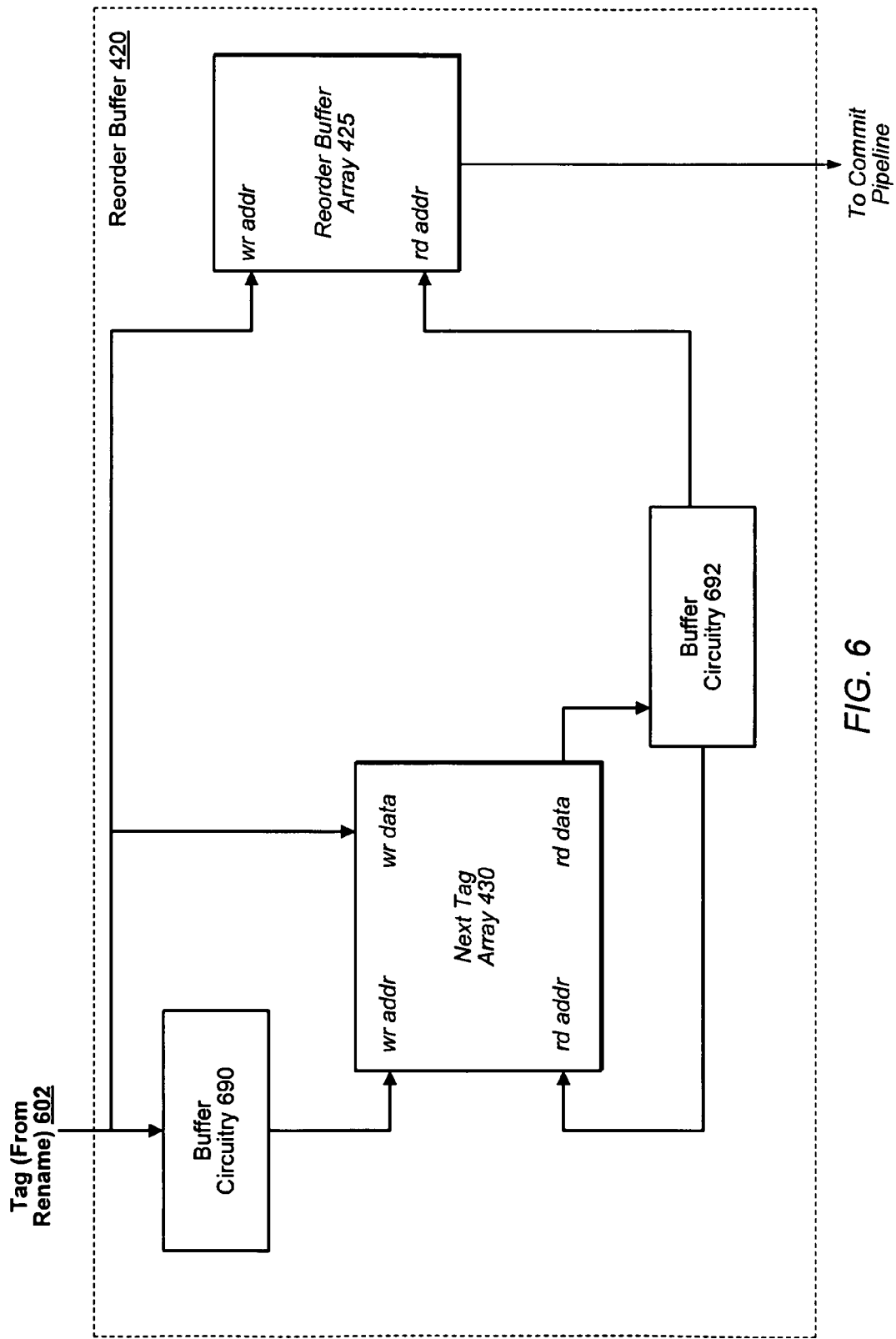
FIG. 6 is a block diagram illustrating an embodiment of reorder buffer 420.

Turning now to FIG. 6, an embodiment of reorder buffer 420 is shown in greater detail. Tag value 602, corresponding to an instruction being executed, is received by reorder buffer 420. In one embodiment, tag value 602 may be received from rename unit 220 in conjunction with the instruction rename process, but the tag value could be received from other structures within processor 100 in other embodiments. Other associated execution information (not depicted) may also be received by reorder buffer 420 in this figure.

Reorder buffer 425 is configured to receive the tag value 602 at its "write address" port. Tag value 602 may have been previously assigned as a common tag value to a group of instructions which may be four instructions in size. The tag value 602 that is being received in FIG. 6 corresponds to a particular one of the one or more of the instructions in the group. (In some embodiments, more than one tag value corresponding to more than one instruction could be received substantially simultaneously.) An entry for the particular instruction assigned with tag value 602 is created in reorder buffer 425 at a location corresponding to tag value 602. (In the same clock cycle or on a different clock cycle, an entry in 425 may be created corresponding to another one of the instructions within the group having tag value 602.)

In one embodiment, reorder buffer 425 may be implemented in two or more portions. In a reorder buffer implemented as two portions, if the particular one of the one or more instructions is an "even" instruction within the group (e.g., instruction 0 or instruction 2 of a four instruction group), then an entry is created in an "even" portion of 425. Likewise if one or more of the instructions is an "odd" instruction, a similar entry is created in an "odd" portion of reorder buffer 425.

Tag value 602 is received by next tag array 430 and by buffer circuitry 690 within reorder buffer 420. While the "write data" port of next tag array 430 receives tag value 602 directly, buffer circuitry 690 functions as a delay to the "write address" port of next tag array 430. Thus the "write address" port of 430 may receive the same value on a subsequent clock cycle that the "write data" port receives on a current clock cycle. Buffer circuitry 690 may be implemented in some embodiments, at least in part, using flip-flops. Buffer circuitries 690 and 692 may be replicated on a per-thread basis. Through this replication, any or all of the threads supported by core 100 may be able to access the next tag array 430, and array 430 may maintain a fixed size regardless of the number of supported threads or the number of threads that is currently active. In some embodiments, buffer circuitries 690 and 692 may thus include thread arbitration units, not depicted, which may keep data for one thread separate from data for another thread.

An entry (not pictured) for the group of instructions associated with received tag value 602 exists in next tag array 430. This entry is active because tag value 602 has already been dynamically allocated from the pool of available tags (e.g., by dynamic allocation unit 310). But the entry does not yet have a value in it—i.e., next tag array 430 does not yet know what tag value (and corresponding group of instructions) will succeed the current group.

The tag value for a new group of instructions (the "next tag value") that follows an older instruction group in program order may arrive at the "write data" port of next tag array 430 some time after tag value 602 arrives. Because tag value 602 is buffered by buffer circuitry 690, however, reorder buffer 420 may be configured such that tag value 602 is presented to the "write address" port of next tag array 430 when the next tag value is present at the "write data" port of array 430. For example, if tag value "5" is received first, and tag value "15" is received next at reorder buffer 420, next tag array 430 may write the data "15" (the new tag) into an entry corresponding to "5" (the old tag). In this way, a linked list of tag groups may be built up, indicating a program order. Note that because buffer circuitries 690 and 692 may be replicated on a per thread basis, next tag array may contain a number of linked lists equal to the number of active threads. These linked lists may all be implemented in next tag array 430, which is shared amongst the threads like the pool of available tags. In certain embodiments, the linked lists will function independently from each other, however, because the program order of one active thread is not necessarily dependent on the program order of another active thread.

In one embodiment, buffer circuitry 692 is configured to store, for each thread, the tag value of the oldest group of instructions that have not yet been committed. Next tag array 430 is configured to provide this value to 692 through its "read data" port. This "oldest tag value" may be used during the completion of execution and/or the beginning of the commit process. In one embodiment, reorder buffer array 425 monitors to see if the instructions corresponding to the oldest tag value have completed execution. Reorder buffer array 425 may be configured to receive indications of execution completion from a completion interface associated with the execution pipeline, for example. If at least some of the group of instructions corresponding to the oldest tag value are ready to commit in program order, reorder buffer array 425 may cause those instructions to be committed (for example, by sending appropriate information to a commit pipeline.)

Buffer circuitry 692 is configured, in one embodiment, to store the oldest currently-executing group tag value (output by the "read data" port of next tag array 430), and feed that oldest tag value back to the "read address" port of array 430 after a delay. (In a given clock cycle, for example, this delay may allow buffer circuitry 692 to output a value that is different from the value being outputted by the "read data" port of next tag array 430.) When all of the instructions corresponding to the "oldest tag value" are ready to commit (or are already being committed), next tag array 430 uses the value input at its "read address" port to lookup the value of the "next" tag in array 430. During or after the lookup, the "next" tag value corresponding to the current group (i.e., the tag for the group of instructions that follows the current group in program order) is then output by the "read data" port of 430. This next tag value is then stored in buffer circuitry 692. (As described above in regard to some embodiments, this "next" tag value may have been entered in array 430 prior to lookup.)

At the point the "next" tag value becomes stored in buffer circuitry 692, that tag value may then be considered the "current" (or "oldest") tag value. (The storing of a "next" tag value in circuitry 692 may thus coincide with an outgoing, older group of instructions that is being sent to commit.) The "current" group of instructions may thus be updated. When the instructions in an "oldest" group of instructions are all sent to commit, the tag allocated to that oldest group of instructions may be freed into the pool of available tags. In this fashion, one group of instructions may retire and another group of instructions may become the next-to-commit group of instructions for a particular thread. The read data port of array 430 may then indicate an updated "next tag" value for the updated current instruction group. Note that the embodiment of FIG. 6 is only one example, and in other embodiments either or both of buffer circuitry 690 and 692 may not be present.

Figure 7:
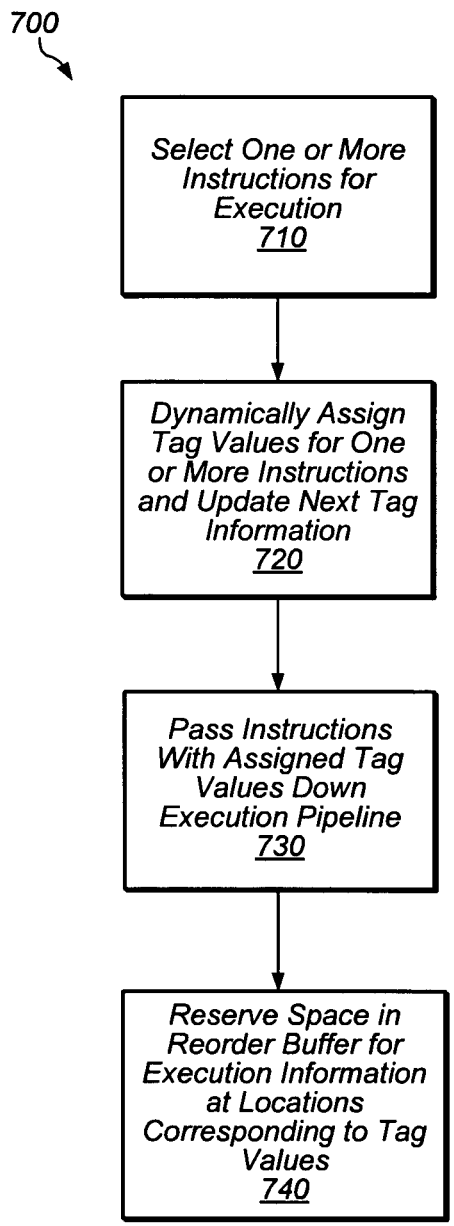
FIG. 7 is a block diagram illustrating one embodiment of a method of performing operations associated with the selection of instructions for execution and the assigning of tags.

Turning now to FIG. 7, a method 700 is shown illustrating operations associated with selecting instructions for execution. At step 710, one or more instructions of a particular thread are selected for execution (this may be done by select unit 210, for example). In step 720, tag values for the selected instructions are assigned. Assignment may occur using dynamic allocation unit 310 as described above, or using any other suitable structure. Next tag information is also updated in step 720 (though this could occur in a different step in other embodiments, such as step 740.) To elaborate, when a new tag value is assigned for a second group of instructions that is immediately subsequent in program flow to a first group of instructions, next tag array 430 is updated. The entry in the array at the index corresponding to the older (first) group tag value is updated to point to the new, "next" tag that has just been assigned for the second group of instructions. Using an example given above, if instructions corresponding to tag value 15 follow instructions corresponding to tag value 5 in program order, upon tag value 15 being assigned, the entry in array 430 corresponding to tag value 5 is updated to point to or otherwise indicate tag value 15 as the tag value for the next group of instructions to be committed after those corresponding to tag value 5.

In step 730, the group of one or more selected instructions are passed down the pipeline for execution along with the assigned tag values and any other associated information. Subsequent to step 730, the one or more instructions may be executed out of order (relative to the original program order) in various stages of the pipeline. In step 740, space in reorder buffer 420 is reserved for execution information for the one or more instructions. (In some embodiments, some execution information may be available from the rename unit 220 at the time the space is reserved in buffer 420, and the available execution information may be entered into buffer 420 during step 740.) The allocated space in reorder buffer 420 may exist in reorder buffer array 425 in some embodiments. The location of the allocated space for execution information corresponds to the tag values assigned to the instructions. Thus as execution information (such an indication of completion) becomes available during or after the execution of the selected one or more instructions, the execution information may be stored in the proper location. Step 740 may occur in conjunction with operations of rename unit 220 in some embodiments. Depending on the setup of the pipeline in core 100 and which structures are performing steps 720 and 740, step 730 may occur between steps 710 and 720 or may occur after step 740. Any portion of or the entirety of steps 710-740 may be performed at least partly in parallel with any other one of those steps.

Figure 8:
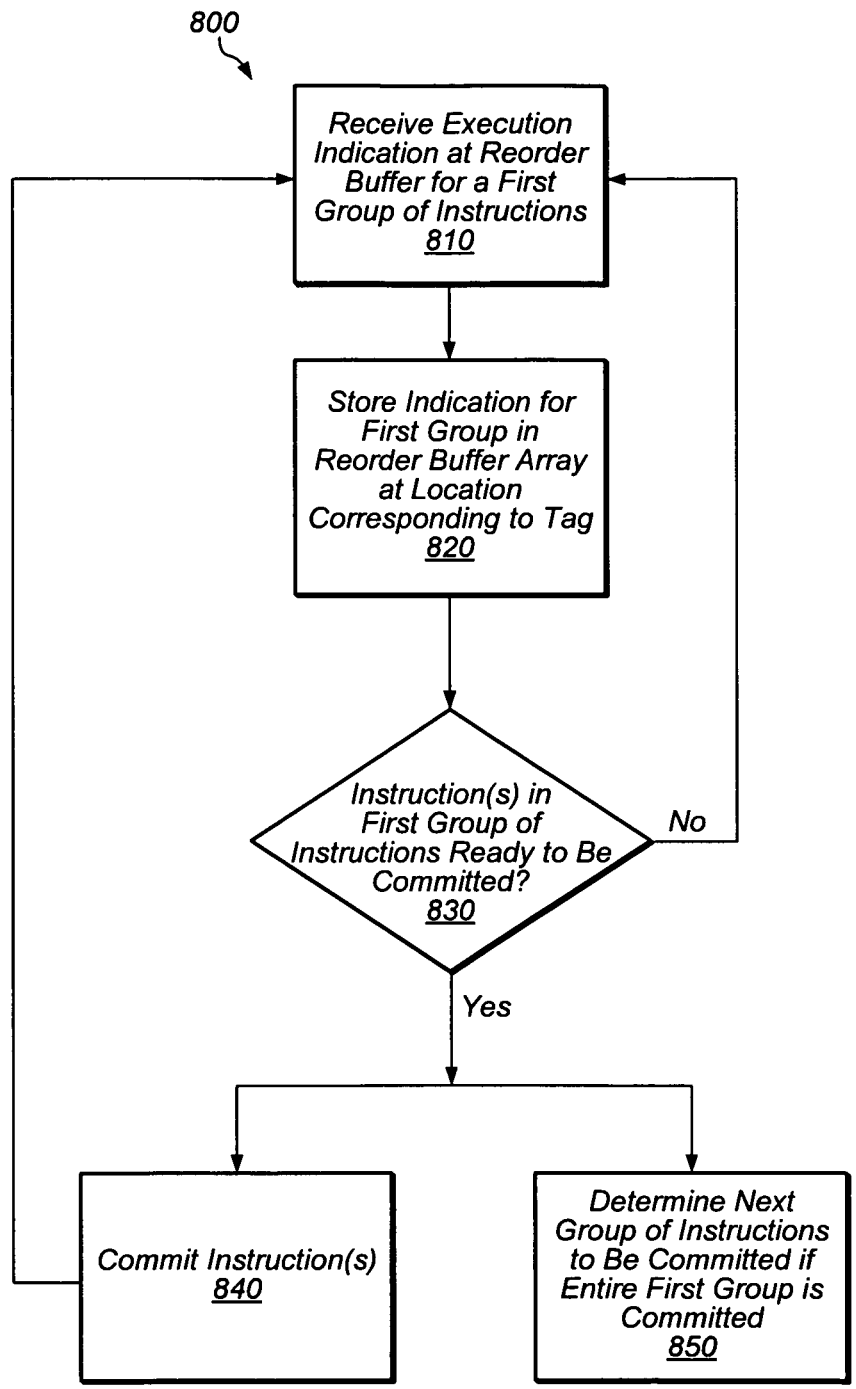
FIG. 8 is a block diagram illustrating one embodiment of a method of performing operations associated with the use of dynamically allocated tags in executing and committing instructions.
Figure 9:
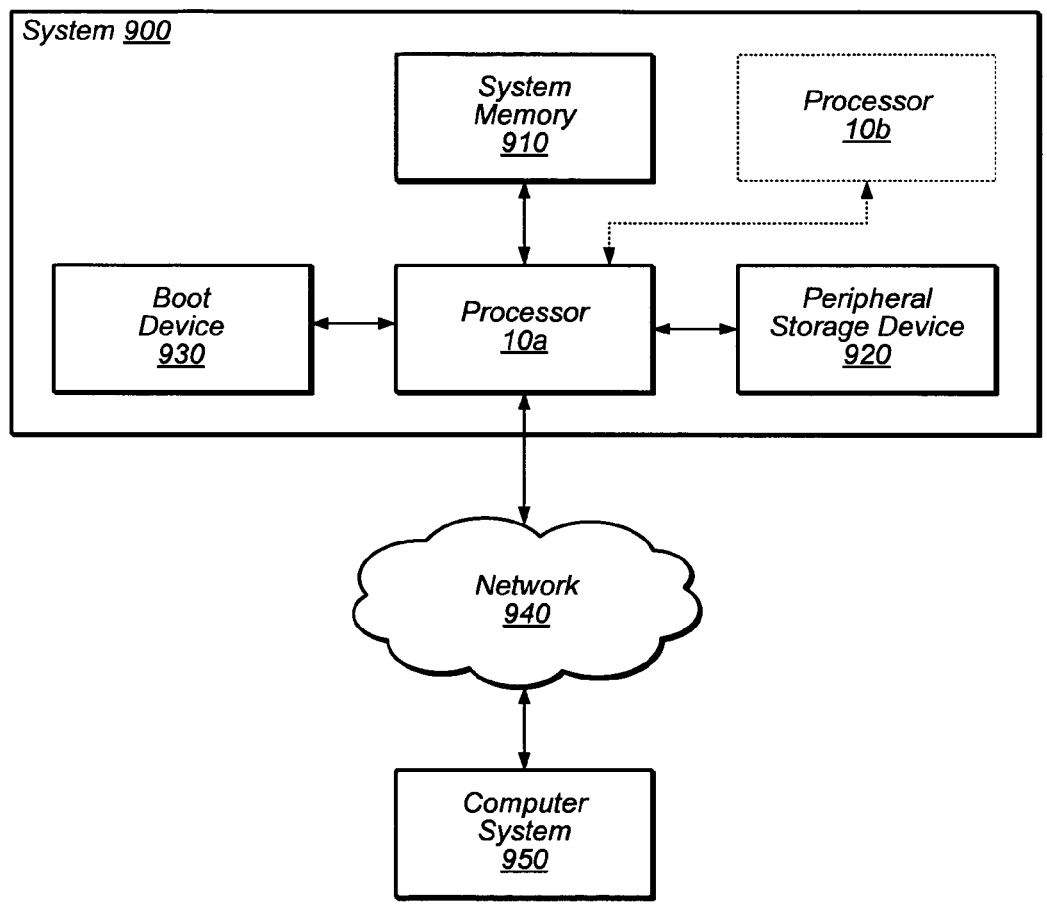
FIG. 9 is a block diagram illustrating one embodiment of a system including processor 10.

Turning now to FIG. 8, a method 800 is shown illustrating one embodiment of operations that may be undertaken in association with completing the execution of instructions in a first group of instructions. In step 810, an indication that execution of a particular instruction has been completed is received at the reorder buffer 420. (The tag value assigned to the particular instruction may also be received.) Note that although method 800 is discussed with respect to receiving only one indication of execution completion of a particular instruction, in some embodiments, multiple indications of execution completion may be received substantially simultaneously.

In step 820, reorder buffer 420 stores the indication that the particular instruction has completed execution at a location in reorder buffer array 425 corresponding to the tag value assigned to the particular instruction. The results may furthermore be stored at a specific entry that corresponds to the particular instruction's placement within the instruction group. For example, though the same common tag may be assigned to both the first and second instructions within a group, the reorder buffer in various embodiments stores respective indications that execution has completed for the first and second instructions at appropriate respective locations within array 425. See, e.g., 552A and 552B in FIG. 3.)

In step 830, reorder buffer 420 determines the ready-to-commit status of the instructions in the group that is associated with the current tag (an indication of which may be stored in circuitry 538 in some embodiments). If the first instruction in the program order of the current group (e.g., the first instruction in a four instruction group) is ready to commit, then step 840 may occur and the first instruction will be committed. If the second instruction in program order for the group is ready to commit, then that instruction may also be committed in step 840, and so on, until all ready-to-commit instructions in the group are committed. (As previously noted, "committing" an instruction may constitute sending that instruction to a commit pipeline or otherwise initiating operations that cause that instruction to be committed.) If the execution indication received in step 810 was for an instruction that is not the first in program order within a group (e.g., the fourth instruction in a group having four instructions), then method 800 may await an indication of completed execution for the instruction in the group that is, in fact, the next instruction in program order to be committed. Thus if an indication of completed execution is received for the fourth instruction of a group before an indication is received for the first instruction in the group, no instructions will be sent to commit at that time, and method 800 may proceed from step 830 back to step 810 to await additional indication(s) of completed execution.

As part of step 840, the processor causes one or more of group of instructions to be committed to an architectural state of the processor. In some embodiments, this may involve sending information for one or more instructions from the reorder buffer 420 to a commit pipeline consisting of various stages and/or operations. Execution results may be copied during commit from the working register file 260 (or in some embodiments, from the reorder buffer or other structure) to a set architectural registers. After commit, the set of architectural registers may reflect the results of the execution of the one or more instructions in the group.

Step 850 may occur in parallel to step 840. If at least one instruction in the current group has not completed execution, or is otherwise not yet ready to commit, method 800 may proceed from step 840 back to step 810 to await further indication(s) of completed execution. If indications of completed execution are received for all instructions in a group, however, the next group of instructions to be committed is determined (for the current thread). This is the group of instructions immediately following, in program order, the group that is being committed. In some embodiments, the next group may be determined by accessing next tag array 430 at the index belonging to the tag value assigned to the previous group. Step 850 may occur subsequent to, or wholly or partially in parallel with, step 840—e.g., while one or more instructions are in the process of being committed, step 850 may be determining the next group in program order using a linked list implemented in next tag array 430.

In certain embodiments, the space(s) allocated in reorder buffer 420 (e.g., the spaces in reorder buffer array 425 and next tag array 430) are freed concurrently with or subsequent to steps 840 and 850. The tag value for the group of instructions being committed is placed back into the pool of tags, which means it is available for future assignment, and the corresponding space in the reorder buffer array is cleared (or is otherwise made available to be overwritten).

As is known to those with skill in the art, program interrupts or exceptions may occur during the execution of instructions by processor 100. Trap logic unit 275 may be equipped to deal with these exceptions or interrupts, and may be configured to perform any necessary special data handling in conjunction with any of the above described structures, including dynamic allocation unit 310, reorder buffer 420, reorder buffer array 425, next tag array 430, and current group circuitry 538. In some circumstances, one or more of the instructions within a dynamically tagged instruction group may be marked as a "dummy" instruction, or otherwise specially handled. For example, if a jump in program flow occurs in the first of a group of instructions, other instructions in that group may not actually have execution results received by reorder buffer 420. Branch mispredicts may likewise be handled as special cases.

Exemplary System Embodiment

As described above, in some embodiments, processor 10 of FIG. 1 may be configured to interface with a number of external devices. One embodiment of a system including processor 10 is illustrated in FIG. 9. In the illustrated embodiment, system 900 includes an instance of processor 10, shown as processor 10a, that is coupled to a system memory 910, a peripheral storage device 920 and a boot device 930. System 900 is coupled to a network 940, which is in turn coupled to another computer system 950. In some embodiments, system 900 may include more than one instance of the devices shown. In various embodiments, system 900 may be configured as a rack-mountable server system, a standalone system, or in any other suitable form factor. In some embodiments, system 900 may be configured as a client system rather than a server system.

In some embodiments, system 900 may be configured as a multiprocessor system, in which processor 10a may optionally be coupled to one or more other instances of processor 10, shown in FIG. 14 as processor 10b. For example, processors 10a-b may be coupled to communicate via their respective coherent processor interfaces 140.

In various embodiments, system memory 910 may comprise any suitable type of system memory as described above, such as FB-DIMM, DDR/DDR2/DDR3/DDR4 SDRAM, or RDRAM®, for example. System memory 910 may include multiple discrete banks of memory controlled by discrete memory interfaces in embodiments of processor 10 that provide multiple memory interfaces 130. Also, in some embodiments, system memory 910 may include multiple different types of memory.

Peripheral storage device 920, in various embodiments, may include support for magnetic, optical, or solid-state storage media such as hard drives, optical disks, nonvolatile RAM devices, etc. In some embodiments, peripheral storage device 920 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 920 may be coupled to processor 10 via peripheral interface(s) 150 of FIG. 1.

As described previously, in one embodiment boot device 930 may include a device such as an FPGA or ASIC configured to coordinate initialization and boot of processor 10, such as from a power-on reset state. Additionally, in some embodiments boot device 930 may include a secondary computer system configured to allow access to administrative functions such as debug or test modes of processor 10.

Network 940 may include any suitable devices, media and/or protocol for interconnecting computer systems, such as wired or wireless Ethernet, for example. In various embodiments, network 940 may include local area networks (LANs), wide area networks (WANs), telecommunication networks, or other suitable types of networks. In some embodiments, computer system 950 may be similar to or identical in configuration to illustrated system 900, whereas in other embodiments, computer system 950 may be substantially differently configured. For example, computer system 950 may be a server system, a processor-based client system, a stateless "thin" client system, a mobile device, etc. In some embodiments, processor 10 may be configured to communicate with network 940 via network interface(s) 160 of FIG. 1.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a computer processor configured to execute instructions for a plurality of threads, wherein the computer processor includes a rename unit, and a reorder buffer that comprises:
   a next tag array having first and second write ports, an output port, and a first read port;
   a reorder buffer array having a third write port and a second read port;
   a first buffer circuit that is configured to receive a first tag value from the rename unit and delay delivery of the first tag value to the first write port of the next tag array, wherein the second write port of the next tag array and the third write port of the reorder buffer array are configured to receive the first tag value from the rename unit at an earlier clock cycle of the computer processor than the first write port of the next tag array receives the first tag value from the first buffer circuit; and
   a second buffer circuit that is configured to receive a second tag value from the output port of the next tag array and provide the second tag value to the first read port of the next tag array and the second read port of the reorder buffer array;
   wherein the computer processor is configured to assign tag values from a fixed set of tag values to instructions being executed by the computer processor, wherein the tag value assigned to a given instruction in a given thread being executed by the computer processor is usable to determine a program order for the given instruction relative to other instructions within the given thread; and
   wherein the computer processor is configured to dynamically allocate tag values in the fixed set of tag values between the plurality of threads.

2. The apparatus of claim 1, wherein the computer processor is configured to dynamically assign a tag value in the fixed set of tag values to each of a plurality of instructions within one of the plurality of threads.

3. The apparatus of claim 2, wherein the computer processor includes an array having a plurality of entries;

wherein the plurality of entries includes a first entry corresponding to a tag value assigned by the computer processor to each instruction in a first group of two or more instructions being executed by the computer processor;
wherein the first entry includes information indicative of a next tag value assigned by the computer processor to each instruction in a second group of two or more instructions being executed by the computer processor;
wherein the next tag value indicates that the second group of instructions are to be committed by the computer processor immediately after the first group of instructions.

4. The apparatus of claim 2, wherein the computer processor is configured to assign an internal identifier to each instruction in a plurality of instructions having a common dynamically assigned tag value;
wherein a program order for each instruction in the plurality of instructions is determinable using both the internal identifier and the tag value assigned to that instruction.

5. The apparatus of claim 1, wherein the computer processor is configured to not allocate any of the fixed set of tag values to any of the plurality of threads that are inactive at a given point in time.

6. The apparatus of claim 1, wherein the computer processor is configured to execute instructions for a first thread; and wherein, at a first point in time, the computer processor is configured to allocate a first number of the fixed set of tag values to instructions in the first thread;
wherein, at a second point in time, the computer processor is configured to allocate a second number of the fixed set of tag values to instructions in the first thread; and
wherein the first and second numbers are different.

7. The apparatus of claim 1, wherein the computer processor includes a first circuit configured to assign tag values and a second circuit configured to commit instructions; wherein the second circuit is configured, upon committing instructions, to provide information to the first circuit indicating that tag values previously assigned to the committed instructions are free.

8. The apparatus of claim 1, wherein the computer processor is configured to execute instructions out-of-order and commit instructions in the program order specified by tag values assigned to the instructions.

9. The apparatus of claim 8,
wherein the reorder buffer array is configured to commit a first plurality of instructions having execution information stored in the reorder buffer in response to receiving information indicating the first plurality of instructions are ready to commit; and
wherein the next tag array is configured to return, in response to receiving a tag value assigned to each of the first plurality of instructions, a next tag value assigned to each of a second plurality of instructions, wherein the next tag value is indicative of a program order in which the second plurality of instructions are to be committed after the first plurality of instructions are committed.

10. The apparatus of claim 1, wherein the reorder buffer array includes first and second arrays configured to receive execution information for instructions, wherein the first and second arrays are configured to respectively receive execution information for two different instructions at least partly in parallel.

11. An apparatus, comprising:
a computer processor configured to execute instructions for a plurality of threads, wherein the processor includes a rename unit and a reorder buffer;
wherein the reorder buffer comprises:
a next tag array having first and second write ports, an output port, and a first read port;
a reorder buffer array having a third write port and a second read port;
a first buffer circuit that is configured to receive a first tag value from the rename unit and delay delivery of the first tag value to the first write port of the next tag array, wherein the second write port of the next tag array and the third write port of the reorder buffer array are configured to receive the first tag value from the rename unit at an earlier clock cycle of the computer processor than the first write port of the next tag array receives the first tag value from the first buffer circuit; and
a second buffer circuit that is configured to receive a second tag value from the output port of the next tag array and provide the second tag value to the first read port of the next tag array and the second read port of the reorder buffer array;
wherein the reorder buffer is configured to store execution information for instructions to be committed by the computer processor;
wherein the reorder buffer is configured, in response to receiving a value indicating a tag value of a first plurality of instructions within a first thread, to generate a next tag value indicating a tag value of a second plurality of instructions within the first thread, wherein the second plurality of instructions are to be committed by the reorder buffer immediately after the first plurality of instructions.

12. The apparatus of claim 11, further comprising a clock circuit;
wherein the computer processor is configured to issue up to two instructions per cycle of the clock circuit;
wherein the reorder buffer is configured to generate an updated value within two cycles of the clock circuit; and
wherein the first and second pluralities of instructions each have four instructions.

13. The apparatus of claim 11, wherein the computer processor includes a select unit configured to:
select a group of instructions for execution from an instruction cache, wherein the group of instructions has a predetermined number of instructions;
assign a common tag value to each instruction in the group of instructions; and
provide information to the reorder buffer to reserve a location in the reorder buffer array for each instruction in the group of instructions, wherein each reserved location is configured to receive execution information for the corresponding instruction.

14. The apparatus of claim 13, wherein the select unit is configured to dynamically allocate tag values between the plurality of threads.

15. The apparatus of claim 13, wherein the reorder buffer is further configured to:
receive execution information for instructions within the group of instructions from a pipeline of one or more execution units of the computer processor;
wherein the received execution information indicates that one or more instructions in the group of instructions have completed execution.

* * * * *